Sept. 20, 1971          D. L. TURNER                3,605,213
                      BAND OR HOSE CLIPS
                      Filed Dec. 10, 1969

INVENTOR.
DAVID LILLEY TURNER
BY

*Barlow & Barlow*
ATTORNEYS

United States Patent Office 3,605,213
Patented Sept. 20, 1971

3,605,213
BAND OR HOSE CLIPS
David Lilley Turner, Coventry, England, assignor to National Research Development Corporation, London, England
Filed Dec. 10, 1969, Ser. No. 883,835
Claims priority, application Great Britain, Dec. 11, 1968, 58,799/68
Int. Cl. B65d 63/02
U.S. Cl. 24—274R
8 Claims

ABSTRACT OF THE DISCLOSURE

A hose clip includes a band which is threaded adjacent one end and has a mounting for a screw at the other end. The mounting includes a pair of parallel side walls and an inclined face which extends across the band and the mounting is formed by deforming said other end of the band. The screw has a conical portion and a spigot extends from the apex thereof and engages in an aperture in the inclined face.

BACKGROUND OF THE INVENTION

Field of the invention

This invention relates to band or hose clips, hereinafter referred to as hose clips, of the kind in which one end portion of the band is adapted to be engaged by a screw which is rotatable relative to the other end of the band, said one end portion of the band overlapping the other end portion when the band is in its operative position in which there is screw threaded engagement between the screw and said one end portion of the band.

Description of the prior art

In previous forms of hose clips of the above kind it has been the general practice to mount the screw so that its mounting point which has been just below the head end of the screw is at a position corresponding to that at which the said one end portion of the band emerges from lapping relation with the other end portion. With such an arrangement the forces acting on the clip, when it has been in, or has been tightened into its clamping position, have tended to tilt the screw out of engagement with the band and it has therefore been necessary to provide a substantial housing in order to hold the screw in engagement with the band. When so mounted the screw has had only a limited rocking movement and so could not ratchet over the threads to allow a user to take up the slack in the band prior to tightening the clip.

It has also been proposed to mount the screw so that the mounting point has been at the trailing end of the threaded end portion of the band and whilst such a proposal has overcome the problem of the screw tilting out of engagement with the band, in that with such an arrangement the screw has tended to tilt or dig into engagement with the band as a result of reaction with the band when the band is in tension, the mounting for the band has been of substantial length and has again prevented one from ratcheting the screw over the threads.

The rigidity of the housing in both arrangements has also given rise to problems when a clip has been used on a fitting whose diameter varies from that for which the clip was specifically designed.

It is an object of the present invention to provide an improved form of hose clip.

SUMMARY OF THE INVENTION

In accordance with the invention the mounting for the screw is formed by deforming an end portion of the band to provide a plurality of relatively inclined parts out of the plane of the adjacent portion of the band, which parts together define a mounting having a bearing aperture to mount the screw rotatably.

Figure 1:
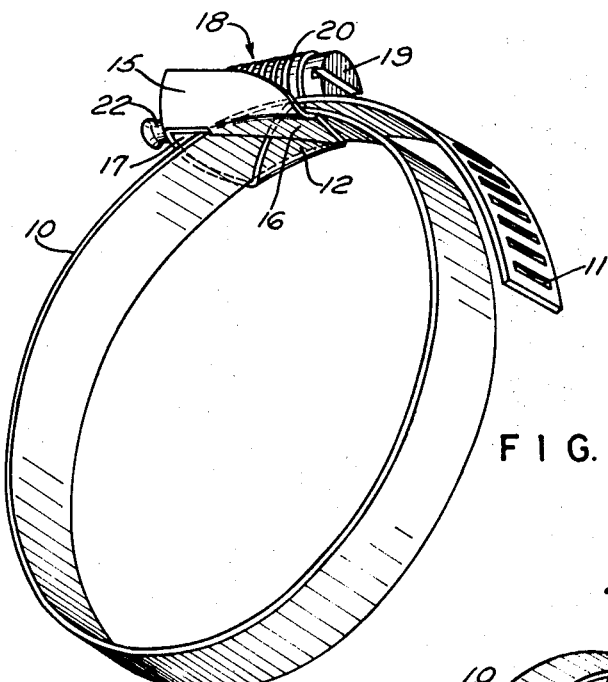
FIG. 1 is a perspective view of one form of hose clip according to the invention.
Figure 2:
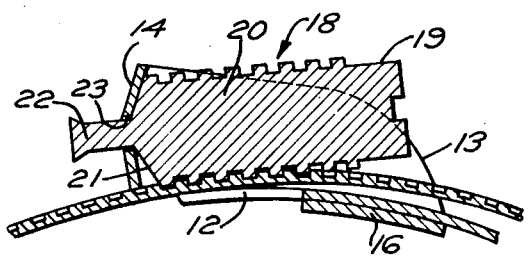
FIG. 2 is a sectional view of the screw and mounting of said one form of hose clip taken in a plane passing through the axis of the screw and to a larger scale than in FIG. 1.
Figure 3:
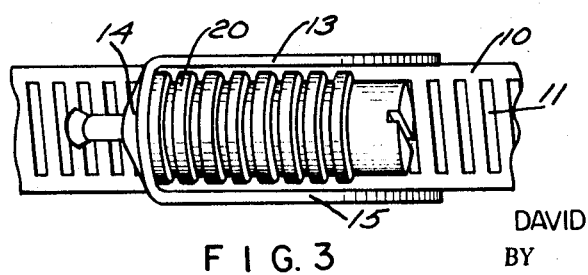
FIG. 3 is a plan view of the screw and mounting of said one form of hose clip.

In the form of hose clip shown in FIGS. 1 to 3, the band 10 has a transverse screw thread 11 over approximately one-third of its length, the thread 11 running from one end of the band. A part 12 of the band spaced from the other end thereof is deformed laterally through an angle of 45° so that the portion of the band adjacent said other end extends on one side of the band and said portion is then bent upwardly to form a first wall 13 which is inclined inwardly slightly towards its upper edge and the lower edge of the first wall is slightly off-set from the edge of the band 10 adjacent said one side. Said portion is then bent transversely away from said one side of the band 10, i.e. across the line thereof, so as to provide a transverse face 14 which is inclined downwardly with respect to the band, the bending to provide the transverse face 14 being effected at a short distance from the previous bend so that the first wall 13 is substantially triangular. Said portion is then bent back, parallel to the first wall 13 to provide a second wall 15 and the length of the transverse face 14 is slightly greater than the width of the band 10. The remainder 16 of said portion which extends below the plane of the band is bent so that it lies against said part 12 of the band to which it is secured by any convenient means, e.g. spot-welding, riveting.

The first and second walls 13 and 15 and the transverse face 14 form a housing and the lower edge of the transverse face 14 and the upper face of the band 10 define a slot 17 which is of sufficient dimensions to receive the threaded end of the band.

The screw 18 of the hose clip includes a slotted head 19 adjacent one end, for co-operation with a screwdriver, a threaded shank portion 20 and a conical portion 21 adjacent the other end. A spigot 22 extends from the apex of the conical portion 21 and is received in an aperture in the transverse face 14, the end of the spigot 22 being headed over so that the screw is held captive.

The aperture 23 is preferably a through-bore and may be formed by plunging so that the metal displaced tends to strengthen the transverse face. Alternatively the aperture may comprise a recess in the lower edge of the transverse face and the recess is preferably formed by pressing.

In the operation in which the aperture 23 in the housing is formed, the transverse face 14 can also be deformed so that the shape thereof conforms more closely to the shape of the conical portion of the screw, i.e. the transverse face is rounded in plan view and has a conical configuration in side elevation. Such a preferred shape is shown in FIGS. 2 and 3. As an alternative, the transverse face can be dished, and the screw can have a hemispherical portion.

When the screw 18 is located in the housing, the conical portion 21 can engage with the transverse face 14 and the shank portion 20 is located between the first and second walls 13 and 15, the arrangement of the spigot 22 in the aperture 23 allowing the screw to rock in the housing.

In operation, the threaded end of the band is introduced into the slot 17 defined by the lower edge of the transverse face 14 and the upper face of the band 10, whereupon it engages the screw which can rock upwardly to allow the band to be passed below it with a ratchet effect, and thus when the clip is to be tightened around an object the initial closing thereof can be effected quickly.

When the clip has been initially closed, the screw is rotated in a direction so as to tighten the band and the conical portion 21 of the screw 18 is forced, by reaction between the screw and the band, into engagement with the transverse inclined face 14 of the housing and the resultant thrust between the screw and the housing tends to force the threaded shank 20 of the screw into more positive engagement with the threaded portion of the band. The screw has a right-hand thread so that rotation of the slotted head 19 in a clockwise direction effects tightening of the clip.

Figure 4:
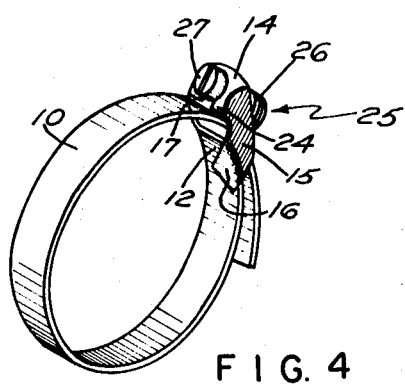
FIG. 4 is a perspective view of a further form of hose clip according to the invention.

In a further embodiment, shown in FIG. 4, the housing is formed in the same manner as described above in relation to the first form of hose clip and the transverse inclined face 14 of the housing is formed with a recess 24 in its lower edge. The screw 25 includes a threaded shank portion 26 extending from one end and a conical portion adjacent the threaded shank 26 which has a spigot extending from its apex, the spigot carrying a slotted head 27. The screw 25 is located in the housing such that the threaded shank 26 is received between the first and second walls 13 and 15 and the spigot engages in the recess 24 and when the band is in tension, the conical portion engages with the transverse inclined face 14.

In operation, the threaded end of the band is introduced into the slot 17 whereupon it engages the screw 25 which rocks upwardly and allows the band to be passed below it with a ratchet effect. Thus when the clip is to be tightened round an object the initial closing of the band can be effected quickly.

When the clip has been initially closed, the screw 25 is rotated in a direction so as to tension the band, and the conical portion of the screw is forced, by reaction between the screw and the band, into engagement with the transverse inclined face 14 of the housing and the resultant thrust between the screw and the housing tends to force the threaded shank 26 of the screw into more positive engagement with the threaded portion of the band. The screw 25 has a left-hand thread so that rotation of the screw head 28 in a clockwise direction effects tightening of the clip.

In the above embodiments, the band can be plain, i.e. unthreaded, and the screw can have a self-tapping thread and on tightening the screw, the screw thread bites into the band and cuts a thread.

In the above embodiments, when the tension has been released from the clip, the screw can be rocked into the "ratcheting" position and the free end of the band then rapidly withdrawn so as to effect total release of the clip.

The first and second walls of the housing tend to prevent the screw from wandering laterally as it may do, for instance, under the action of frictional forces resulting from rotation of the screw.

In a further form of the invention (not shown), the mounting for the screw is formed by slitting said other end of the band longitudinally to form two tongues and each is bent, along a line at 45° to the end of the slit, so as to extend under the band and transversely away therefrom. One tongue, which extends from one edge of the band, is then bent upwardly and inwardly to form a first inclined wall and is then bent again, at a point above the center line of the band, to form an end portion which is directed downwardly towards the other edge of the band. The other tongue is then bent upwardly and inwardly so as to lie against the end portion of said one tongue and to provide a second inclined wall. Said other tongue is then bent again at a point adjacent the bend in said one tongue so that the end portion of said other tongue lies against the first inclined wall. Thus the mounting provided is substantially V-shaped.

The screw includes a threaded shank portion extending from one end, a neck portion of reduced diameter adjacent the shank and a slotted head at its other end. The neck portion of the screw is located by the V-shaped mounting and the head of the screw is disposed adjacent the remote end of the mounting, the screw being provided with a left-hand thread.

I claim:
1. A hose clip which includes:
 (a) A band having first and second end portion movable into overlapping relationship,
 (b) A screw, having a threaded portion and an unthreaded portion, operatively associated with one end portion of the band and arranged to have threaded engagement with the other end portion and,
 (c) Means mounting the screw for rotation relative to said one end portion of the band, said mounting means engaging the screw at a location on the screw adjacent that end of the threaded portion thereof remote from the end proper of said other end portion of the band when the band is in the form of a closed loop,
 (d) Said mounting means being formed entirely by deformation of said one end portion of the band and including means defining a single bearing aperture rotatably mounting said unthreaded portion of the screw.

2. A hose clip as claimed in claim 1 wherein the mounting means includes a pair of side walls which extend above the plane of the band and an end wall, which has an aperture therein, which joins said side wall and which is inclined so as to act, in use, to thrust the screw into engagement with the band.

3. A hose clip as claimed in claim 2 wherein the mounting means further includes a part which is turned back to underlie the band in face to face engagement therewith.

4. A hose clip as claimed in claim 2 wherein each side wall lies in a plane parallel to the adjacent edge portion of the band and each side wall has an inclined upper edge.

5. A hose clip as claimed in claim 2 wherein the inside face of the end wall provides a conical seat.

6. A hose clip as claimed in claim 1 wherein the band is initially unthreaded and the screw is a self tapping screw so that when the clip is tightened a screw thread is formed on the band.

7. A hose clip as claimed in claim 1 wherein the screw includes a slotted head adjacent one end and a threaded shank portion and is provided with a frusto conical portion adjacent the leading end, the frusto conical portion having a spigot extending from its smaller diameter end.

8. A hose clip as claimed in claim 1 wherein the screw includes a threaded shank portion which extends from one end, a frusto conical portion adjacent the shank portion and a spigot which extends from the smaller diameter end of said frusto conical portion and the spigot carries a slotted head.

References Cited
UNITED STATES PATENTS

| | | | |
|---|---|---|---|
| 1,584,935 | 5/1926 | Hathorn | 24—274P |
| 2,362,901 | 11/1944 | Jamie | 24—274 |
| 2,940,150 | 6/1960 | Rizzo | 24—274 |
| 3,371,392 | 5/1968 | Rueckheim | 24—274 |

DONALD A. GRIFFIN, Primary Examiner